No. 860,999. PATENTED JULY 23, 1907.
O. G. SUNDEN.
SPARK ARRESTER.
APPLICATION FILED MAR. 22, 1906.

2 SHEETS—SHEET 1.

WITNESSES:

INVENTOR
O. G. Sunden.
By
Attorneys.

No. 860,999.

PATENTED JULY 23, 1907.

O. G. SUNDEN.
SPARK ARRESTER.
APPLICATION FILED MAR. 22, 1906.

2 SHEETS—SHEET 2.

WITNESSES:
C. K. Reichenbach.
J. C. Jones

INVENTOR
O. G. Sunden
BY
Attorneys.

UNITED STATES PATENT OFFICE.

OLOF G. SUNDEN, OF CHICAGO, ILLINOIS.

SPARK-ARRESTER.

No. 860,999.      Specification of Letters Patent.      Patented July 23, 1907.

Application filed March 22, 1906. Serial No. 307,433.

*To all whom it may concern:*

Be it known that I, OLOF G. SUNDEN, a citizen of the United States, residing at Chicago, in the county of Cook, State of Illinois, have invented certain new and useful Improvements in Spark-Arresters; and I do hereby declare the following to be a full, clear, and exact description of the invention, such as will enable others skilled in the art to which it appertains to make and use the same.

This invention relates to the use of spark arresters and has for its object to provide a simple and inexpensive device of this character which will efficiently arrest the sparks from an engine or the like and which will also purify the smoke.

The invention relates to that class of spark arresters including spirally placed deflector strips which serve to give to the smoke a vortical movement.

A further object of the invention is to provide a specific construction and arrangement of blades which will render the device more efficient in operation than similar devices of this nature.

Figure 2:
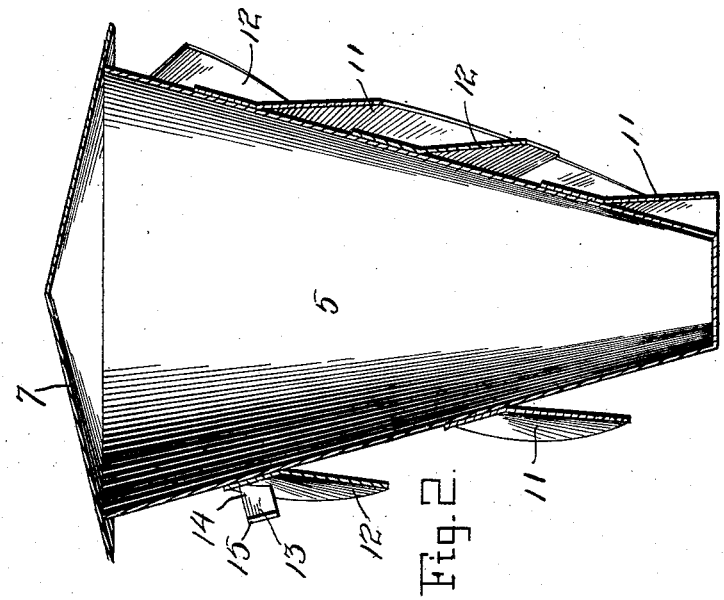
Figure 1:
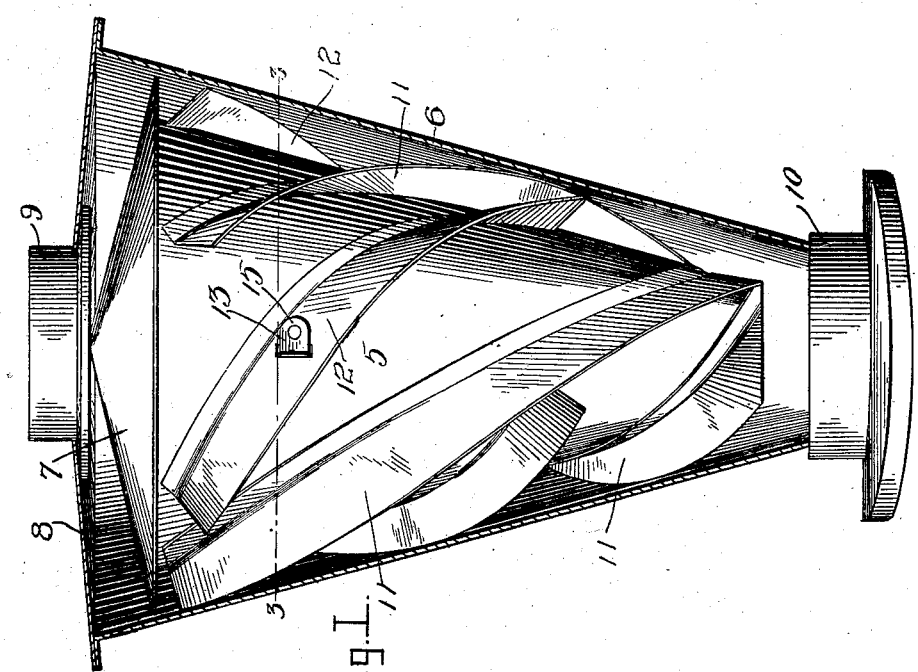
Figure 3:
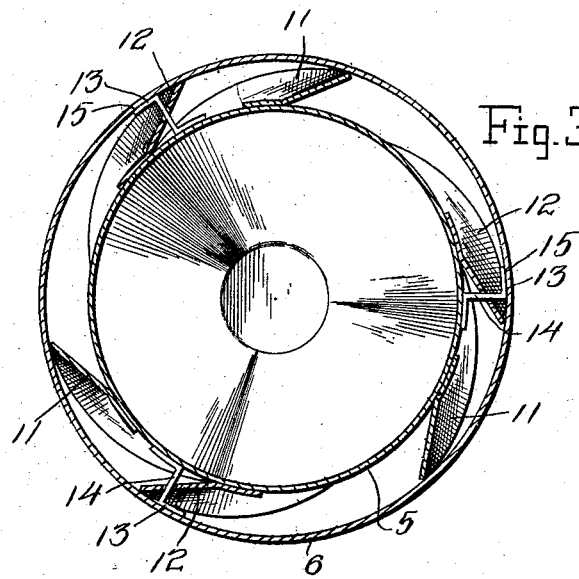
Figure 4:
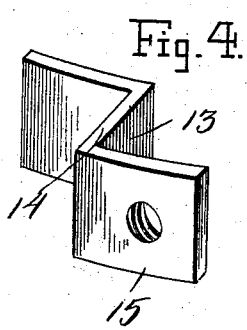

In the accompanying drawings: Figure 1 is an elevation of the invention, the outer casing being shown in section. Fig. 2 is a vertical sectional view through the inner casing with the outer casing removed. Fig. 3 is a horizontal sectional view on the line 3—3 of Fig. 1, and, Fig. 4 is a detail perspective view of one of the brackets for the outer casing.

Referring to the drawings, the numerals 5 and 6 denote respectively the inner and outer casings of the device. Each of these casings is conical in form and the inner casing 5 is closed at both of its ends. The closure for the upper end of the casing 5 is in the form of a cap 7 which has its outer edge portion extending beyond the sides of the casing, but in spaced relation to the inner wall of the casing 6. The outer casing 6 is provided with a cap 8 which latter is provided centrally with an opening in which is engaged a flanged column 9 through which the purified smoke has its outlet. At its lower end, the outer casing 6 is connected with a flanged collar 10 which is secured in the usual manner.

Secured to the outer face of the inner casing 5 is a series of major blades 11 and minor blades 12, the said blades being arranged spirally upon the said casing. The minor blades are disposed at an angle to the major blades and are of less length than the said major blades. The minor blades 12 lie at such an angle that their upper ends are nearer to the next adjacent blade in the direction of their curvature and their lower ends are nearer the next adjacent blade upon the opposite side of the minor blade from the said major blade.

Secured upon the outer surface of the inner casing 5 are brackets 13 including each an attaching portion which extends at right angles to the body portion 14 of the bracket and a right angularly extending end 15 which is provided with a threaded aperture for the passage of a screw which also extends through the outer casing 6, the purpose of the said brackets being to hold the inner and outer casings in fixed spaced relation to each other.

In the drawings, it will be seen that the minor blades 12 have their upper ends substantially in a line with the upper ends of the major blades, but have their lower ends terminating considerably short of the plane occupied by the lower ends of the major blades.

In operation, the smoke from the furnace will be given a vortical movement by the deflector blades 11 and 12 and the sparks or cinders will be directed against that portion of the cap 7 which extends beyond the upper end of the inner casing 5 by reason of the fact that the body portion of each of the blades lies at an acute angle to the inner casing 5.

What is claimed is:

1. A device of the class described comprising an inner and an outer casing, major and minor deflector blades secured to the inner casing and projecting into the space between the inner and outer casings, said major and minor blades being inclined at acute angles with respect to each other, and a cap closing the upper end of the inner casing and extending beyond the upper edge thereof.

2. A device of the class described comprising an inner and an outer casing, major and minor blades carried by the inner casing and projecting into the space between the inner and outer casings, said minor blades being disposed at an acute angle with respect to said major blades and extending in the same general direction as the said major blades, and a cap closing the upper end of the inner casing and extending beyond the edge thereof.

3. A device of the class described comprising an inner and an outer casing, deflector blades carried by said inner casing and having their deflector portions lying at an acute angle to the wall of said inner casing and projecting into the space between the said inner and outer casings, and a cap closing the upper end of the inner casing and projecting beyond the edge thereof.

4. A device of the class described comprising an inner and an outer casing, deflector blades carried by said inner casing and having their deflector portions lying at an acute angle to the wall of said inner casing, certain of said blades being disposed at an acute angle to the other blades, the blades being projected into the space between the inner and the outer casings, and a cap closing the upper end of the inner casing and projecting beyond the edge thereof.

In testimony whereof, I affix my signature, in presence of two witnesses.

OLOF G. SUNDEN.

Witnesses:
    CHAS. R. BACKMAN,
    ERNST BRONZELL.